United States Patent

[11] 3,593,418

| [72] | Inventor | James P. Evans<br>3233 S.W. 23rd St., Oklahoma City, Okla. 73108 |
|---|---|---|
| [21] | Appl. No. | 831,857 |
| [22] | Filed | June 10, 1969 |
| [45] | Patented | July 20, 1971 |

[54] SAFETY WARNING DEVICE
1 Claim, 3 Drawing Figs.

[52] U.S. Cl. ..................................... 40/130, 340/90
[51] Int. Cl. ..................................... G09f 13/00
[50] Field of Search ........................... 340/90, 102; 40/132 D, 129, 130, 132

[56] References Cited
UNITED STATES PATENTS

| 1,514,711 | 11/1924 | McKamey | 40/132 D |
| 2,975,401 | 3/1961 | Shupe | 340/102 |
| 3,469,235 | 9/1969 | Devlin et al. | 340/102 |

FOREIGN PATENTS

| 720,147 | 12/1954 | Great Britain | 40/132 D |

Primary Examiner—Lawrence Charles
Assistant Examiner—Wenceslao J. Contreras
Attorney—Dunlap, Laney, Hessin & Dougherty ABSTRACT: A safety warning device constituting a sign attachable to the bumper of a vehicle, or mountable at the rear window of a vehicle, and including a pair of translucent or transparent panels which carry indicia and are mounted in a supporting structure in vertically spaced relation to each other. Behind each of the panels is mounted means for illuminating the panel, and transmitting light therethrough. The illuminating means is electrically actuated, and the electrical circuitry utilized includes a flasher device for intermittently energizing and deenergizing the source of illumination, ON-OFF switches mounted on the dashboard of the automobile for directing electrical energy to the source of illumination behind a selected one of the two panels, and a source of electrical energy such as a battery or the like.

PATENTED JUL 20 1971  3,593,418

INVENTOR.
JAMES P. EVANS

BY
Dunlap, Laney, Hessin & Dougherty
ATTORNEYS

3,593,418

SAFETY WARNING DEVICE

BACKGROUND OF THE INVENTION

1. Field of the Invention

This invention relates to signs, and more particularly, to safety warning devices useful in preventing vehicular accidents.

2. Brief Description of the Prior Art

On late-model automobiles, it has become the practice to install a flasher device in the circuitry to the taillights of the automobile for causing intermittent making and breaking of the circuit to these lights at a time when the flasher device is energized. The purpose of the inclusion of the flasher device in the circuitry is to permit vehicular traffic to be apprised of the fact that a vehicle whose taillights are flashing by reason of the use of this flasher device is disabled and constitutes a possible hazard to vehicular traffic flow. It is also well known to provide stationary and portable signs which can be set up on the highway, on the shoulder, or on the right-of-way at some point for the purpose of warning vehicles of the existence of a dangerous situation along the roadway so that caution may be exercised and possible accidents avoided.

BRIEF DESCRIPTION OF THE PRESENT INVENTION

The present invention provides a safety warning device for use on automobiles, which device can be quickly installed on the automobile, either for viewing through the rear window thereof, or for exposure by mounting on the rear bumper thereof, and which device communicates to motorists following the vehicle carrying the device the condition of the roadway ahead of the vehicle on which the device is mounted. The device may also be completely demounted from the vehicle and set up in the roadway at some distance behind the vehicle to advise motorists of the fact that the vehicle is parked ahead on or to one side of the roadway in a disabled condition.

The traffic warning device of the invention is in the character of an electric sign, and comprises a supporting structure in which a pair of indicia-carrying translucent or transparent panels are detachably mounted in vertically spaced relation. The panels are illuminated so as to be made visible from one side of the device by sources of illumination, preferably light bulbs, which are mounted on the supporting structure behind the panels. The light bulbs are connected by appropriate electrical circuitry through a flasher device and ON-OFF switches to a source of electrical power, such as the battery of the automobile. Suitable brackets are mounted on the supporting structure to permit the safety warning device to be quickly mounted upon, or suspended from, the bumper of the automobile. There are also attached to the supporting structure, a pair of legs which can be used to support the device on a flat surface, such as that characteristically provided adjacent the rear window of the automobile, or the roadbed of a highway.

From the foregoing description of the invention, it will have become apparent that the present invention provides a relatively economically constructed, yet highly useful, safety warning device which can improve the safety with which vehicles can be operated on the highway.

Another object of the invention is to provide a safety warning device which can visually apprise motorists of dangerous conditions along a thoroughfare, and which is very flexible and utilitarian in presenting several different modes of usage.

An additional object of the invention is to provide a mechanically rugged, highly reliable safety warning device which is characterized in having a long and trouble-free operating life.

An additional object of the invention is to provide a traffic warning device in the form of an automobile-mountable electrical sign in which the particular information indicia of the sign can be changed or varied very quickly and easily to suit a particular need.

Other objects and advantages of the invention will become apparent as the following detailed description of the invention is read in conjunction with the accompanying drawings which illustrate the invention.

DETAILED DESCRIPTION OF A PREFERRED EMBODIMENT OF THE INVENTION

Figure 1:
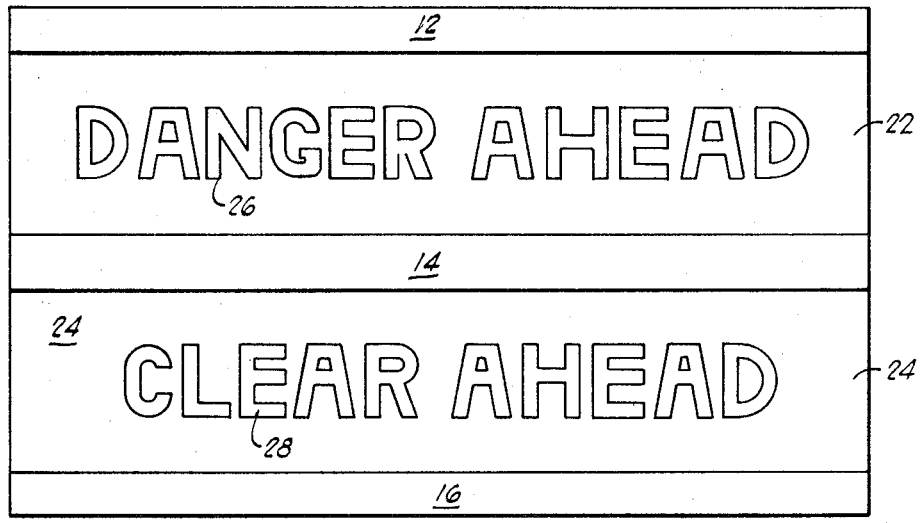
FIG. 1 is a side elevation view of the safety warning device constructed in accordance with the present invention.

The safety warning device of the invention includes a supporting structure designated generally by reference numeral 10. The supporting structure 10 includes three substantially parallel, elongated members 12, 14 and 16, these members being substantially rectangular in cross section in the embodiment of the invention which is illustrated. The members 12, 14 and 16 are vertically spaced from each other and are retained in this spatial relationship by a plurality of vertically extending connecting members 18 and 20. The connecting members 18 and 20 are secured to the members 12, 14 and 16 at their opposite ends, and are preferably constructed of an electrically nonconductive or insulating material for purposes hereinafter described.

The facing surfaces of the members 12, 14 and 16–that is, the upper surface of the member 16, the two opposite side surfaces of the member 14 and the lower surface of the member 12–are slotted over the length of these members so that light-translucent or transparent panels may be slidingly mounted in the slots formed in these facing surfaces. Thus, an upper panel 22 is provided and is positioned in the slots in the members 12 and 14 and a lower panel 24 is provided and is positioned in the slots in the members 14 and 16. As will be apparent in referring to FIG. 1, the upper panel 22 carries certain indicia which, in the illustrated embodiment of the invention, constitute letters forming the words "DANGER AHEAD." The indicia on the lower panel 24 constitute letters forming the words "CLEAR AHEAD." It will be noted that the open-ended character of the slots formed in the members 12, 14 and 16 permit the panels 22 and 24 to be quickly and easily removed from the supporting structure 10 and replaced by other panels carrying other indicia if this should be desirable.

Secured to the opposite side of the vertically extending members 18 and 20 from the members 12, 14 and 16 are a pair of horizontally extending, substantially parallel channel members 30 and 32. The channel members 30 and 32 are substantially C-shaped in cross section, and each of the channel members is provided intermediate its length with a pair of sockets for receiving light bulbs. Thus, the channel member 30 has sockets 34 and 36 mounted thereon, and the channel member 32 has mounted thereon sockets 38 and 40. The channel members 30 and 32 are preferably electrically conductive members which can be secured to any portion of an automobile framework or chassis by a wire for purposes of grounding. Extending to the sockets 34 and 36 is an electrical wire 42 which functions as the hot lead in the circuit in which the light bulbs in the sockets are located. Similarly, an electrical lead 44 is extended to the sockets 38 and 40 and is a hot lead. The electrical circuitry forming a portion of the invention will be described in greater detail hereinafter.

Figure 2:
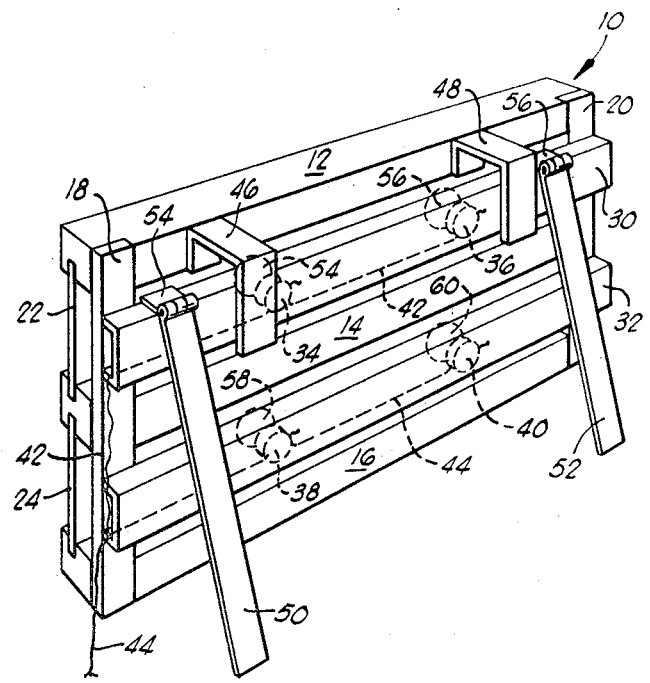
FIG. 2 is a perspective view of the safety warning device of the invention as it appears when viewed from the rear thereof and slightly above the device.

Secured to the horizontally extending member 12 intermediate its ends are a pair of horizontally spaced, substantially U-shaped brackets 46 and 48. The U-shaped brackets 46 and 48 project rearwardly from the supporting structure 10 and are provided for permitting the safety warning device to be suspended from the rear bumper of a vehicle. There is also provided to the rear side of the supporting structure 10, a pair of supporting legs 50 and 52 which are hingedly connected at their upper ends to plates 54 and 56 which are secured in any suitable way to the upper side of the channel member 30. The legs 50 and 52 may thus be folded to a position in which they abut the channel member 32 and thus do not interfere with the use of the brackets 46 and 48 for suspending the safety warning device from the bumper or, alternatively, the legs 50 and 52 may be opened out in the manner shown in FIG. 2 to provide a tripod-type support for the safety warning device to permit it to be placed adjacent the rear window of an automobile or positioned in an upright status on a roadbed, or on the shoulder of the road.

Figure 3:
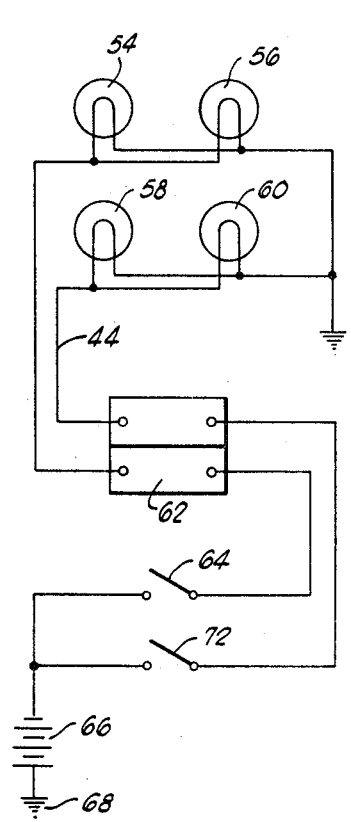
FIG. 3 is an electrical wiring diagram showing the electrical circuitry utilized in the safety warning device of the present invention.

The electrical circuitry utilized in the safety warning device of the invention is best illustrated in FIG. 3 of the drawings. As here shown, the circuitry includes light bulbs 54 and 56 which are adapted to be screwed into the sockets 34 and 36, and light bulbs 58 and 60 which are adapted to be screwed into the sockets 38 and 40. The bulbs 54 and 56 are connected in series and to one portion of a compound flasher device 62. The circuit to the bulbs 54 and 56 is made through the flasher device 62 to an ON-OFF switch 64 which is located on the dashboard or instrument panel of the vehicle. The switch 64 is in turn connected through a battery 66 to ground 68. The bulbs 54 and 56 are grounded through the sockets 34 and 36 and the channel member 30 upon which these sockets are mounted.

The bulbs 58 and 60 are adapted to be screwed into the sockets 38 and 40 and to be grounded through these sockets and the channel member 32 to the chassis or framework of the automobile. The hot lead 44 from the bulbs 58 and 60 extends to the compound flasher device 62, and from this device the hot lead extends through an ON-OFF switch 72 to the battery 66.

OPERATION

In the operation of the safety warning device of the invention, several usages of the device may be made, but in each instance, the mode of operation is generally the same. Thus, when the supporting structure 10 has been located adjacent the rear window of an automobile, or has been suspended from the bumper by means of the brackets 46 and 48, or has been placed on the roadway using the legs 50 and 52, the operator of a vehicle utilizing the safety warning device can then close the ON-OFF switch 64 so that the light bulbs 54 and 56 are flashed on and off intermittently by means of the flasher device 62. This will have the effect of intermittently illuminating (in a flashing manner) the panel 22 so that the letters spelling DANGER AHEAD are flashed to a motorist approaching the vehicle in which the safety warning device is located, or in conjunction with which it is utilized.

The CLEAR AHEAD words carried on the panel 24 will generally be utilized when the safety warning device is positioned adjacent the rear window of the vehicle. Thus, when a vehicle is proceeding along a highway, and the safety warning device is in this position in such vehicle, the operator of the vehicle can flash a message to any vehicle which may be following, apprising the operator of the following vehicle of whether a car is approaching from the opposite direction making passing dangerous. In like manner, the fact that the road ahead is clear, and that passing is safe can also be indicated. Which of the messages is flashed to the following vehicle operator will depend upon which of the ON-OFF switches 64 or 72 located on the dashboard of the vehicle carrying the safety warning device is closed.

Although a preferred embodiment of the invention has been herein described in order to provide an exemplary illustration of the basic principles of the invention, it is to be understood that various changes can be made in the described structure without departure from these basic principles. All changes and innovations of this type are therefore deemed to be circumscribed by the spirit and scope of the invention.

What I claim is:
1. A safety warning device comprising:
   three substantially parallel, elongated, horizontally extending members vertically spaced from each other and longitudinally slotted along opposed facing edges;
   connecting members interconnecting said horizontally extending members;
   socket-mounting means secured to said connecting members;
   a pair of spaced, indicia-carrying light-transmissive panels detachably mounted on said supporting structure with each of said light-transmissive panels being slidingly positioned between two of said elongated, horizontally extending members and each having longitudinal edges positioned in slots carried by the elongated, horizontally extending members between which the respective light-transmissive panel is located whereby said light-transmissive panels may be slidably removed from between said elongated, horizontally extending members;
   a light bulb socket mounted adjacent each of said light-transmissive panels on said socket mounting means;
   a light bulb in each of said light bulb sockets;
   a flasher device connected to each of said light bulbs for intermittently making and breaking an electrical circuit thereto;
   an ON-OFF switch connected through said flasher device to each of said light bulbs;
   a battery connected to said switches;
   a pair of horizontally spaced brackets secured to one of said elongated, horizontally extending members and projecting therefrom for hooking said safety warning device over the bumper of an automobile; and
   a pair of horizontally spaced legs each having one end pivotally connected to one of said elongated, horizontally extending members, and each having a free end engageable with a substantially horizontally extending surface for supporting said safety warning device in an upright position on said horizontally extending surface.